Aug. 27, 1935.　　　　H. P. MAAS　　　　2,012,539
AUTOMOTIVE STOP SWITCH
Filed May 24, 1933　　　2 Sheets-Sheet 1
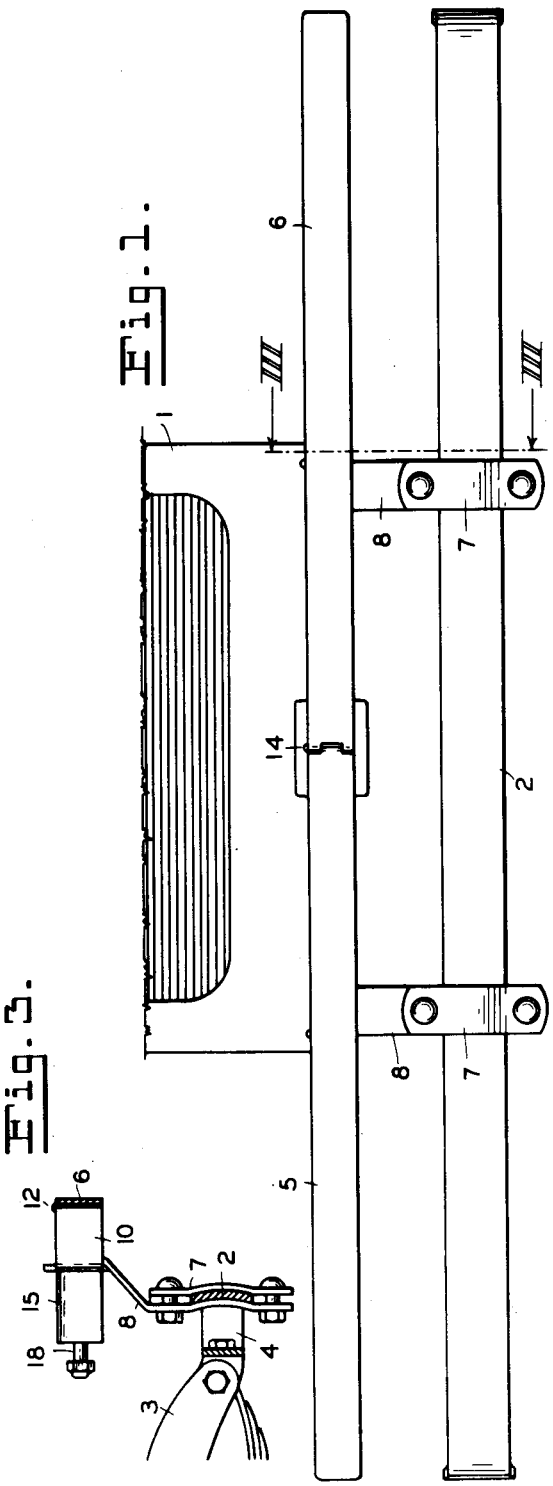
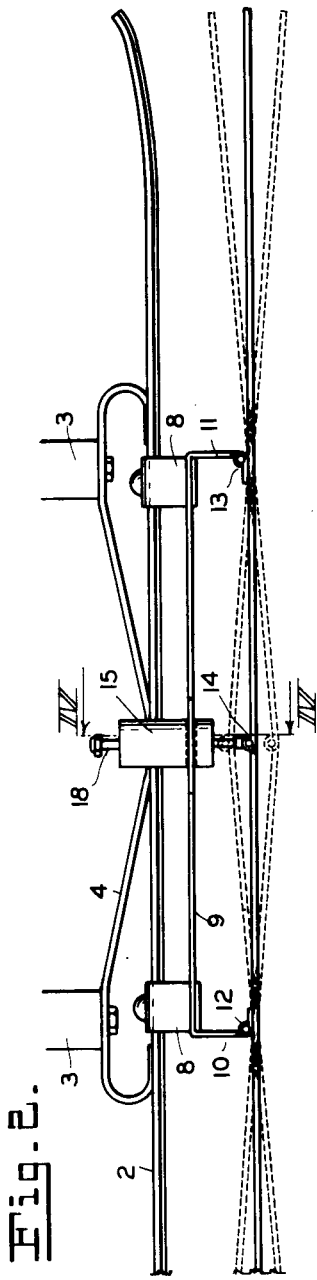
INVENTOR
HUGO P. MAAS.
BY
ATTORNEY.

Aug. 27, 1935.  H. P. MAAS  2,012,539
AUTOMOTIVE STOP SWITCH
Filed May 24, 1933  2 Sheets-Sheet 2
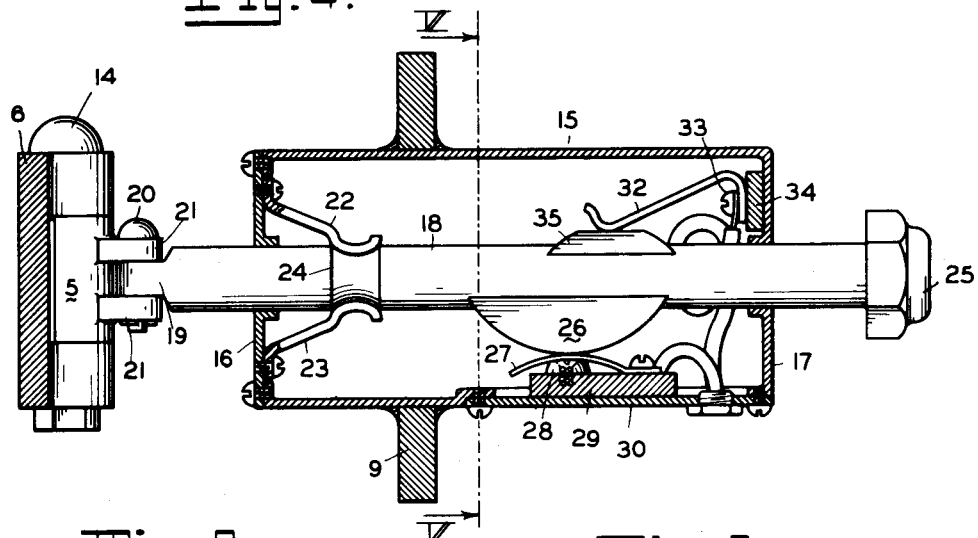
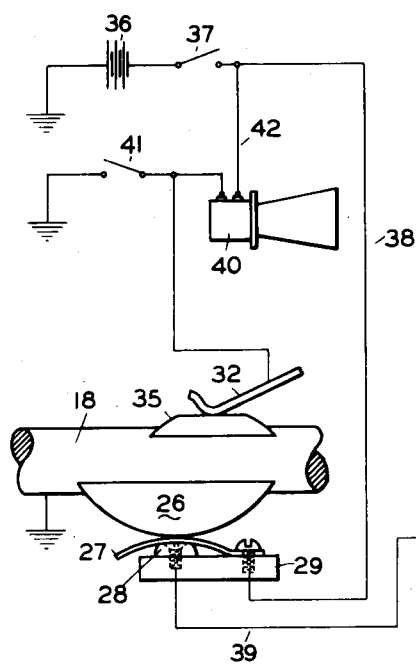
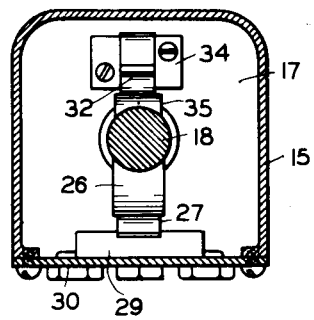
INVENTOR:
HUGO P. MAAS.
BY
ATTORNEY Patented Aug. 27, 1935

2,012,539

UNITED STATES PATENT OFFICE 2,012,539

AUTOMOTIVE STOP SWITCH

Hugo P. Maas, San Francisco, Calif.

Application May 24, 1933, Serial No. 672,565

4 Claims. (Cl. 180—83)

This invention relates to improvements in automotive stop switches and more particularly to means for automatically stopping motor vehicles.

Among the objects of the invention is to shut off the motive power of an automotive vehicle independent of the driver when the vehicle collides with a pedestrian, another vehicle or obstructive object.

Another object is to prevent the "hit and run" operation of vehicles following a collision.

Another object is to prevent the restarting of the vehicle from the driver's seat after a collision except by resetting the stop mechanism which necessitates delay and dismounting from the driver's seat.

A further object is to attract attention from afar to such collisions.

Other objects and advantages will appear as the description progresses.

In this specification and the accompanying drawings, the invention is disclosed in its preferred form. It is to be understood, however, that it is not limited to this form because it may be embodied in other forms without departing from the spirit of the invention as defined in the claims following the description.

In the two sheets of drawings:

Fig. 1 is a front elevation of the front bumper of a motor vehicle, a fragmentary portion of which is diagrammatically illustrated, equipped with a collision stop mechanism constructed in accordance with this invention.

Fig. 2 is a plan view from above of the same.

Fig. 3 is an end view of the same partly in vertical section taken on the line III—III, Fig. 1.

Fig. 4 is a longitudinal vertical section through the collision switch and displacing member, in enlarged detail, taken on the line IV—IV, Fig. 2.

Fig. 5 is a vertical cross section of the collision switch on the line V—V, Fig. 4.

Fig. 6 is a wiring diagram of the motor control electric circuit indicating the horn, ignition and collision units incorporated therein.

In detail, the construction illustrated in the drawings comprises the forward portion of a motor vehicle 1 and attached bumper 2 which are conventional and will vary in different types of vehicles. The bumper is attached to the ends 3—3 of the vehicle frame by the spring bracket 4 or otherwise.

For convenience, the collision bars 5 and 6 are attached to the bumper 2 by the clamps 7—7 bolted to the base brackets 8—8. The base bar 9 is welded or fixed to the brackets 8—8 and preferably extends forward of and parallel with the bumper 2. The ends 10 and 11 of the base bar extend forward and form part of the strap hinges engaging the pintle pins 12 and 13. The opposed portions of these hinges are fixed to the backs of the bars 5 and 6 which are thus fulcrumed intermediate their lengths on the pins 12 and 13 respectively.

The inner ends of the bars 5 and 6 are formed to interlock and pivot on the pintle 14. If a collision or rearward pressure occurs on any portion of either of the bars 5 and 6, they will pivot on the centers 12, 13 and 14 as indicated in dotted lines in Fig. 2.

The collision switch is set behind and in line with the pintle 14. It comprises the base housing 15 fixed within the base bar 9 and having the removable front cover 16 and the closed end 17. The sliding rod 18 extends through the housing and is guided in the ends 16 and 17 through which it protrudes. The end 19 of the rod is flattened and pivotally engages the pin 20 engaging the lugs 21—21 welded or fixed to the center hinge at 14.

The rod 18 is thus caused to move in unison with the bars 5 and 6 when displaced by any collision that will cause them to fulcrum on the pins 12 and 13. Pressure between the points 12 and 13 will push the rod 18 rearward and pressure on either bar lateral to the points 12 and 13 will pull the rod forward. Similarly a "side swipe" collision from the side in a forward direction on the outer ends of the bars 5 and 6 will push the rod 8 rearwardly.

The bars 5 and 6 are held in longitudinal alinement by the spring fingers 22 and 23 fixed to the inside of the cover 16 and frictionally engaging the annular groove 24 in the rod 18. This also holds the rod 18 on a definite normal center of operation. The lugs 21—21 striking the cover 16 limit the back push of the rod 18. Its forward movement is arrested by the acorn nut 25 screwed onto the end of the rod.

The dielectric cam 26 is fixed to the underside of the rod 18, and depresses the resilient contactor 27 against the fixed contact 28, forming a normally closed switch in the ignition circuit hereinafter more fully described. The contacts 27 and 28 are fixed to the dielectric block 29 by screws. This block is fixed to the removable plate 30 forming part of the bottom of the housing 15.

A similar resilient contactor 32 is fixed by the screw 33 to the insulating block 34 which is fixed to the end 17 of the housing. This contactor 32 through the grounded rod 18 forms a switch in the horn circuit normally held open by the cam 35.

The motor control electric circuit is conventional except for the imposition of the collision switch and the signal subcircuit, see Fig. 6. Current flows from the battery 36, across the switch 37, when closed, over the wire 38, through the closed collision switch 27—28, over the wire 39, through the primary of the ignition to the ground which completes the motor control circuit when the switch 37 is closed.

The horn or other signal 40 cannot be operated by the switch 41 unless the switch 37 is closed except in the case of a collision with the bars 5 or 6. This prevents the operation of the horn when the vehicle is "parked". With the ignition switch 37 closed, current flows from the battery 36, over the wire 42, through the horn 40, across the closed switch 41 to the ground.

This invention operates substantially as follows: presume the ignition switch 37 to be closed and the motor running. If the motor vehicle is progressing and strikes a pedestrian, another vehicle or resisting object with the collision bars 5 or 6, the bars pivot on their fulcrums 12 and 13 and move the rod 18 forward or backward as previously described. This overcomes the frictional resistance of the detent 22—23—24, displaces the cams 26 and 35 which opens the ignition circuit, stops the motor and closes the horn circuit. The offending vehicle can not be operated until the driver dismounts and resets the ignition circuit by restoring the bars 5 and 6 to normal. This also opens the horn circuit and stops the continuous din of the horn calling attention to the fact that a state of collision exists.

Having thus described this invention, what is claimed and desired to secure by Letters Patent is:

1. In combination with a motor vehicle having a motor control electrical circuit; a collision switch in said circuit; a movable collision bar arranged to close said switch in normal position and adapted to open said switch when moved in either direction from said normal position.

2. In combination with a motor vehicle having a motor control electrical circuit; a pivoted collision bar; a switch in said circuit actuated by said bar and adapted to be opened when said bar is moved in either direction from normal position.

3. In combination with a motor vehicle having a frame and a motor control electrical circuit; a pair of collision bars hinged together and individually pivoted on said frame; a switch in said circuit and having a member adapted to operate the switch when moved in either direction from normal position, said operating member being connected to said hinged bars.

4. In combination with a motor vehicle having a motor control electrical circuit including a source of current and the primary of an ignition system; a collision switch interposed in said circuit between said source of current and said ignition primary; a manual switch interposed between said source of current and said collision switch; signal means in a subcircuit connected in parallel with said collision switch and said ignition primary but arranged in series with said source of current and said manual switch; means for closing the subcircuit including said signal means when said collision switch is opened; and collision actuated means on said vehicle adapted to open said collision switch.

HUGO P. MAAS.